United States Patent [19]

Higuchi et al.

[11] Patent Number: 4,894,579

[45] Date of Patent: Jan. 16, 1990

[54] APPARATUS FOR EFFECTING FINE MOVEMENT BY IMPACT FORCE PRODUCED BY PIEZOELECTRIC OR ELECTROSTRICTIVE ELEMENT

[75] Inventors: Toshiro Higuchi, Yokohama; Masahiro Watanabe, Tokyo, both of Japan

[73] Assignee: Research Development Corporation of Japan, Tokyo, Japan

[21] Appl. No.: 197,254

[22] Filed: May 23, 1988

[30] Foreign Application Priority Data

May 29, 1987 [JP] Japan .................... 62-131304

[51] Int. Cl.⁴ ............................. H01L 41/08
[52] U.S. Cl. .................................. 310/328
[58] Field of Search ............ 310/321, 323, 328, 329; 248/636, 638

[56] References Cited

U.S. PATENT DOCUMENTS

| | | | |
|---|---|---|---|
| 3,808,488 | 4/1974 | Massa | 310/328 |
| 4,195,243 | 3/1980 | Thaxter | 310/328 X |
| 4,523,120 | 6/1985 | Assard et al. | 310/328 X |
| 4,678,955 | 7/1987 | Toda | 310/328 |
| 4,686,440 | 8/1987 | Hatamura | 310/328 X |

OTHER PUBLICATIONS

IEEE, 1987, Micro Robots and Teleoperators workshop.
10th World Congress on Automatic Control Preprints.

Primary Examiner—Mark O. Budd
Attorney, Agent, or Firm—Armstrong, Nikaido, Marmelstein, Kubovcik & Murray

[57] ABSTRACT

An apparatus for effecting a fine movement of an object for making use of impact produced by a piezoelectric/electrostrictive element having a moving member, a piezoelectric/electrostrictive element attached to said moving member, means for driving the piezoelectric/electrostrictive element, and an inertia member operative in response to the driving of the piezoelectric/electrostrictive element so as to impart an impact to the moving member. As an electric field is applied to the piezoelectric/electrostrictive element, a strain is caused by a stress which acts to expand or contract the piezoelectric/electrostrictive element to a length determined by the level of the electric field. By making use of this phenomenon, impact is produced by the inertia member which operates in response to the stress, thereby effecting a step-like fine movement of the moving member. Thus, the inertia member is impactingly driven by elongation or contraction of the piezoelectric/electrostrictive element so that a reactional force overcomes the friction acting between the moving member and a base so as to realize a fine movement of the moving member.

8 Claims, 12 Drawing Sheets

Fig. 7
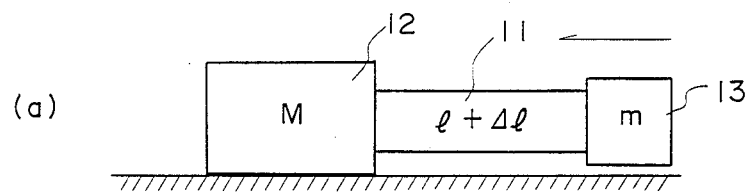
(a)
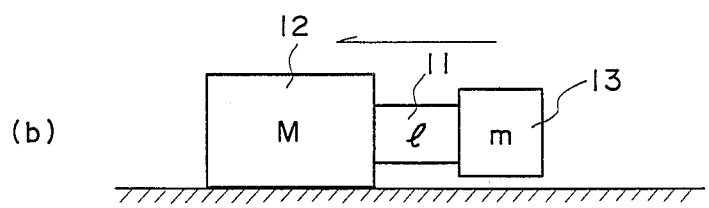
(b)
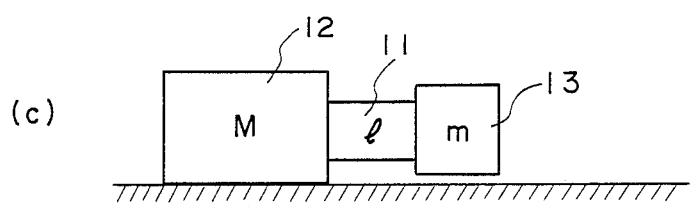
(c)
Fig. 8
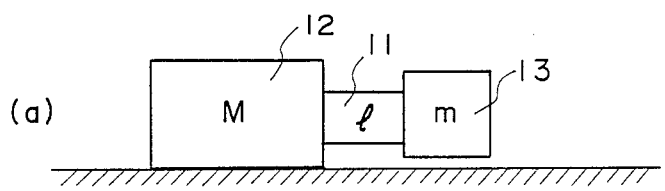
(a)
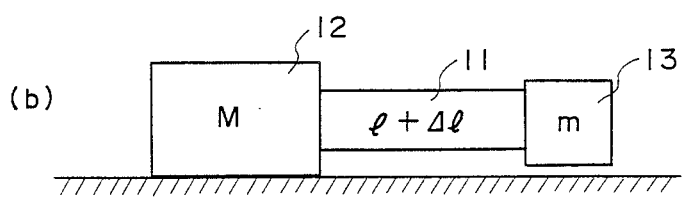
(b)
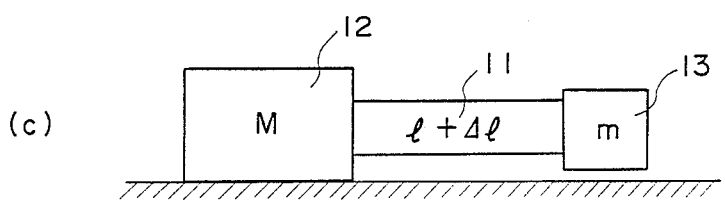
(c)

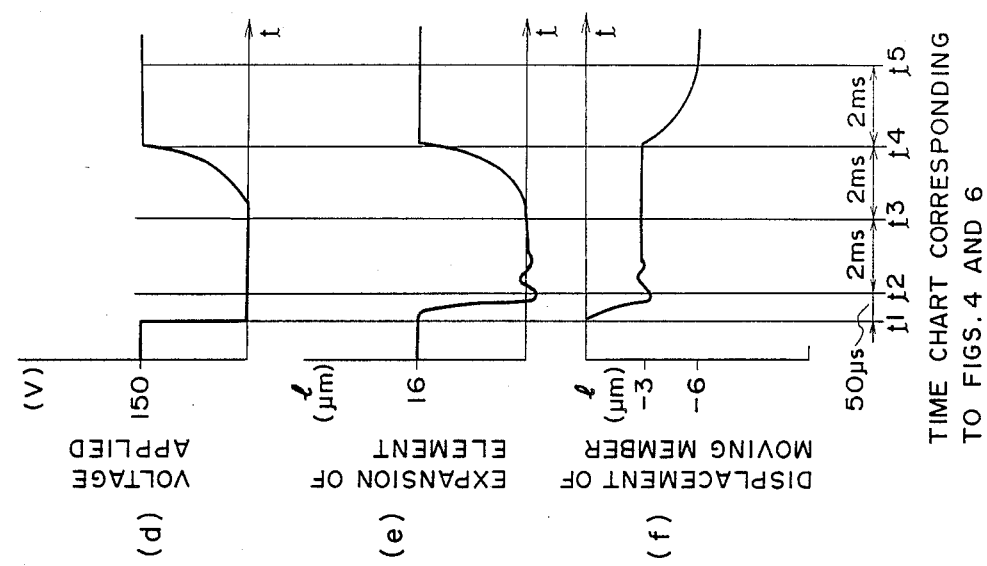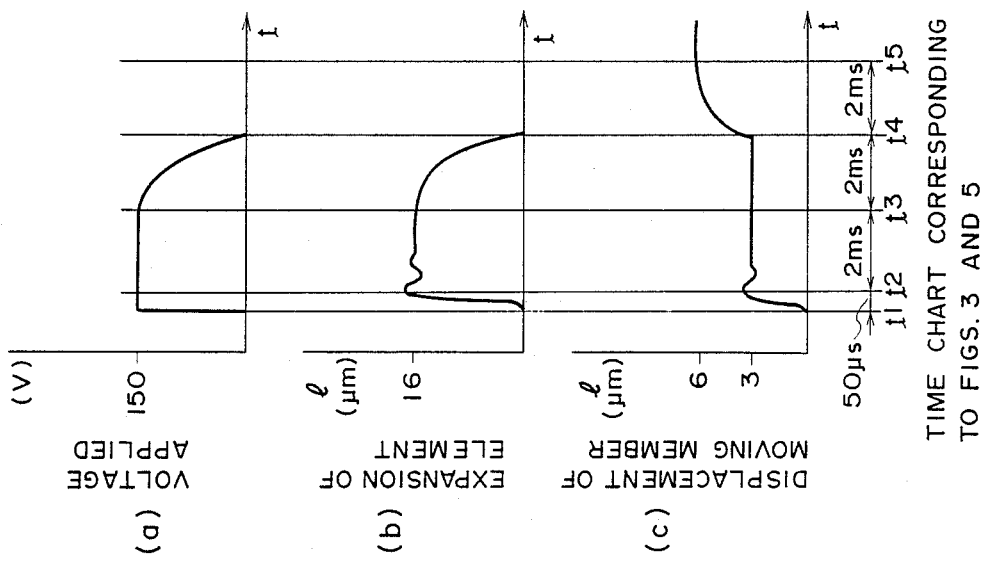

Fig. 13
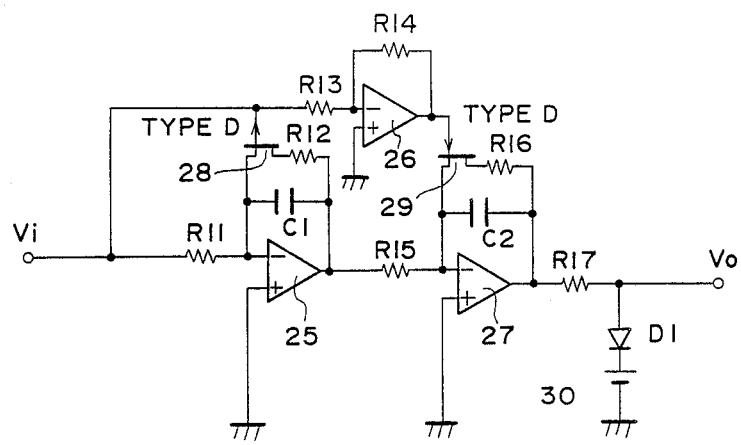
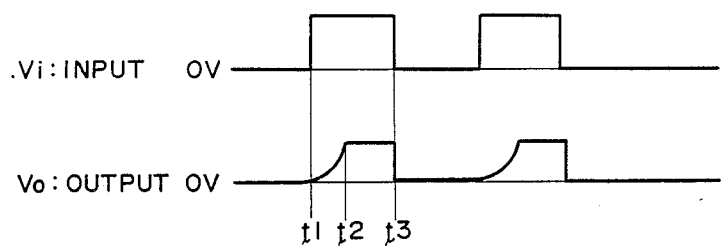
Fig. 14
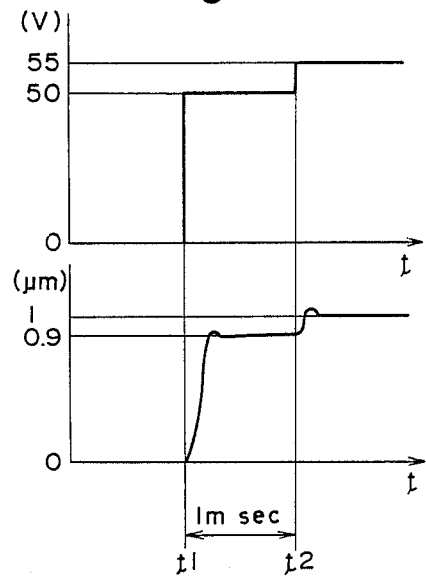
Fig. 15
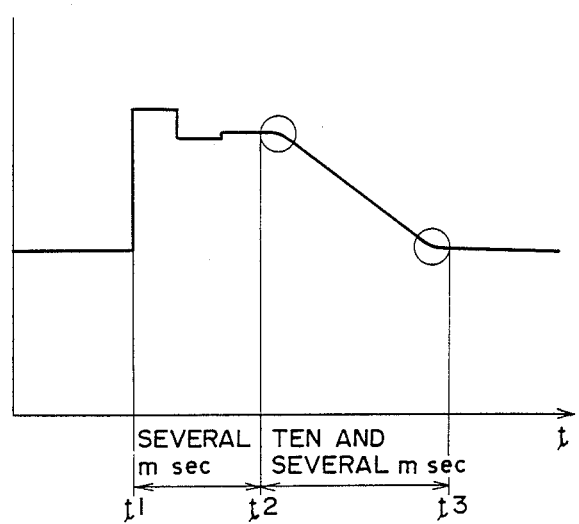

a,b : INFLECTION PART

APPARATUS FOR EFFECTING FINE MOVEMENT BY IMPACT FORCE PRODUCED BY PIEZOELECTRIC OR ELECTROSTRICTIVE ELEMENT

BACKGROUND OF THE INVENTION

The present invention relates to an apparatus for effecting a fine movement of an object by making use of impact produced by a piezoelectric/electrostrictive element.

FIGS. 1 and 2 illustrate known apparatus for effecting a fine movement of an object by a mechanical means. Referring first to FIG. 1 which illustrates a first type of known apparatus for effecting fine movement, a moving member 1 having a mass M is provided with an electromagnetic device. On the other hand, a coil 3 as an inertia member is supported on the moving member through a buffer member 2 such as a spring. In operation, the electromagnetic device produces an electromagnetic impacting force which is caused by repulsion and collision of the coil 3, thereby effecting fine movement of the moving member.

Referring now to FIG. 2 schematically illustrating a second type of known apparatus, a moving member 5 incorporates an electromagnetic device capable of imparting an impact to the moving member 5. The moving member 5 has legs constituted by a permanent magnet so that the moving member 5 is moved by a small amount by impacting force produced by the electromagnetic device, while being attracted to the surface of a base on which a groove 8 is formed.

The moving apparatus relying upon impacting electromagnetic force essentially requires a circuit which generates a magnetic field by means of a coil. The coil has to have certain volume and surface area in order to attain a high efficiency while avoiding generation of heat, magnetic field or electromagnetic noise. Furthermore, both types of known apparatus mentioned above suffer from a common disadvantage in that noise and dust tend to be generated due to collision of the inertia member.

SUMMARY OF THE INVENTION

Accordingly, an object of the present invention is to provide a compact and highly efficient apparatus for effecting a fine movement by an impacting force which is produced by a piezoelectric/electrostrictive element capable of performing a noise-less driving without generating any magnetic field and electromagnetic noise.

For this purpose, according to the present invention, there is provided an apparatus for effecting a fine movement comprising: a moving member, a piezoelectric/electrostrictive element attached to the moving member, and an inertia member adapted to impact the moving member by the driving force produced by the piezoelectric/electrostrictive element so as to effect a small amount of movement.

BRIEF DESCRIPTION OF THE DRAWINGS

FIG. 7 is an illustration of a third method of driving;

FIG. 8 is an illustration of a fourth method of driving;

FIG. 9 is a time chart illustrating the timings of operation shown in FIG. 5 or 7;

FIG. 10 is a time chart illustrating the timings of operation shown in FIG. 6 or 8;

FIG. 13 is an illustration of the waveform of the input to a driving amplifier, as produced by an analog circuit;

FIG. 14 is a flow chart illustrating the fine adjustment to a setting position performed by the apparatus of the invention;

FIG. 15 is a waveform chart illustrating the waveform of a voltage applied for effecting fine position adjustment to a setting position;

DESCRIPTION OF THE PREFERRED EMBODIMENTS

Preferred embodiments of the present invention will be described hereinunder with reference to the accompanying drawings.

The apparatus of the present invention for effecting fine movement employs different driving methods which rely upon different types of constructions. These driving methods will be described first in advance of the description of the respective embodiments.

Figure 1:
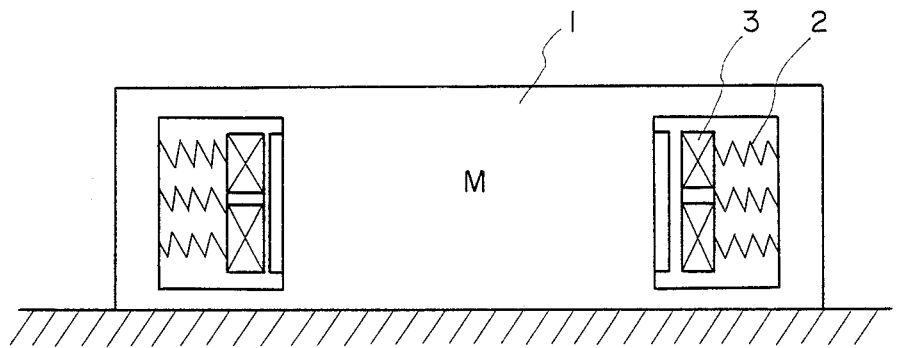
FIGS. 1 and 2 are illustrations of different types of known apparatus for effecting a fine movement.
Figure 2:
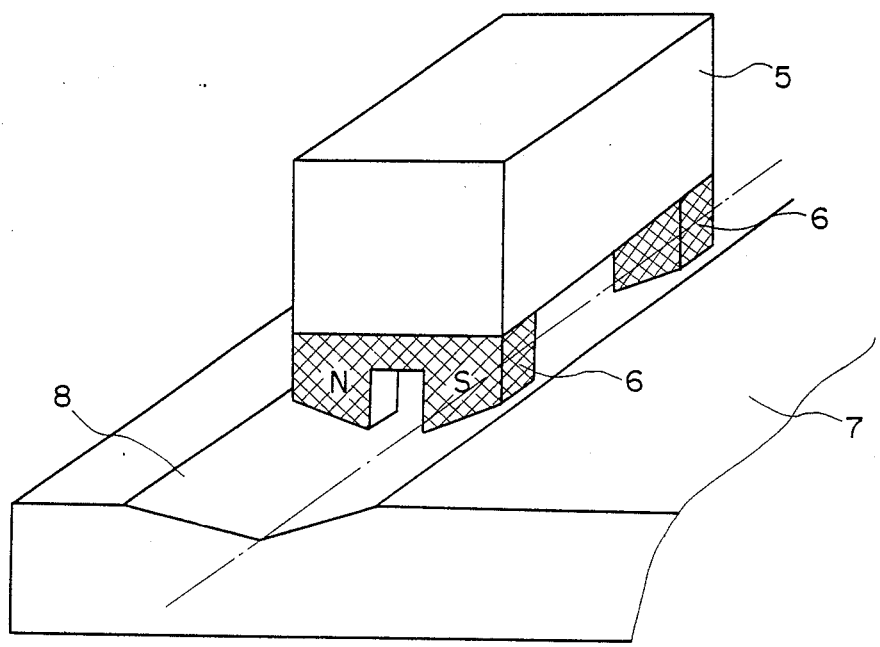
Figure 3:
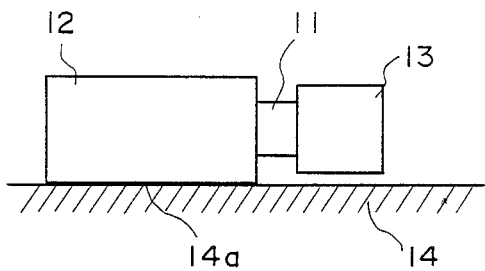
FIG. 3 is a schematic side elevational view of an apparatus for effecting a fine movement which shows a first embodiment of the present invention.
Figure 4:
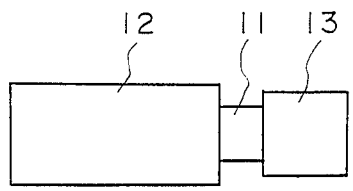
FIG. 4 is a schematic plan view of the first embodiment.

Referring to FIG. 3, a moving member 12 is fixed to one end of a piezoelectric/electrostrictive element 11 capable of generating impact force. An inertia member 13 is fixed to the other end of the piezoelectric/electrostrictive element 11. A numeral 14 designates a base having a friction surface 14a.

The construction of the piezoelectric/electrostrictive element and the construction of the driving circuit for driving this element will be described later.

Figure 5:
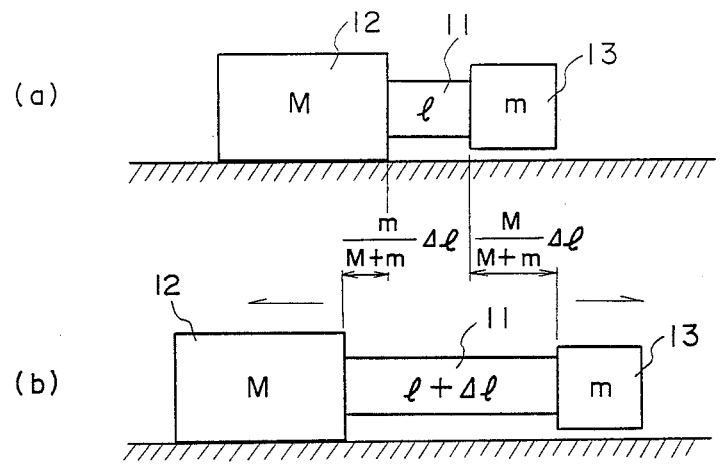
FIG. 5 is an illustration of a first method of driving.
Figure 6:
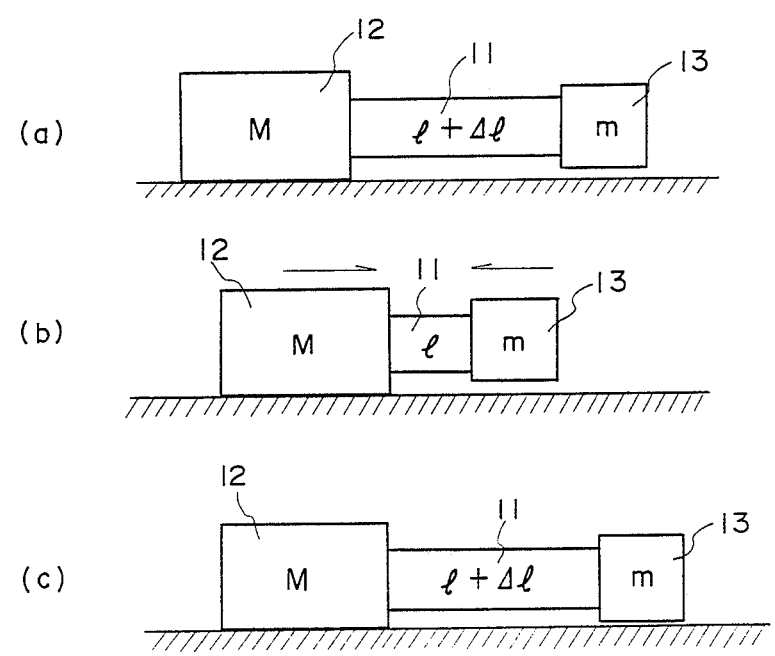
FIG. 6 is an illustration of a second method of driving.

A description will be made hereinunder as to the method of driving the apparatus for effecting a fine movement, with specific reference to FIGS. 5 and 6.

[Driving Method 1-A]

(1) As will be seen from FIG. 5(a), an electric field is drastically applied to the piezoelectric/electrostrictive element 11 to charge up this element 11, so that a strain is caused in the piezoelectric/electrostrictive element 11. It is assumed here that the elongation of the piezoelectric/electrostrictive element 11, determined by the charging voltage applied to the element 11 having no strain, is represented by $\Delta l$. Thus, the piezoelectric/electrostrictive element 11 with strain is considered as being equivalent to a spring having a spring constant k and compressed by the amount $\Delta l$. In other words, the illustrated system can be considered as being equivalent to a system in which the moving member 12 of a mass M and the inertia member 13 having a mass m are attached to both ends of the spring.

(2) The spring starts to expand as illustrated in FIG. 5(b). In this case, the force which causes the spring to expand is represented by $k\Delta l$. When this force is greater than the frictional force $\mu(M+m)g$ ($\mu$: friction coefficient, g: force of gravity) acting between the moving member 12 and the base 14, the moving member 12 starts to move in the direction counter to the inertia member 13. The influence of the frictional force is negligible when M, m and k are designed such as to meet the condition of $\mu(M+m) < < k\Delta l$. Since the position of the centroid of the system composed of the moving member and the inertia member is unchanged due to the theorem of conservation of momentum. In consequence, the moving member 12 moves by an amount $[m/(M+m)]\Delta l$, while the inertia member 13 moves by an amount $[M/(M+m)]\Delta l$ in the direction opposite to the movement of the moving member 12.

(3) Then, one cycle of movement is completed when the elongated piezoelectric/electrostrictive element 11 is gently reset to the original length, as shown in FIG. 5(c). In this case, a caution is required to meet the condition of $\mu(M+m)g > ma$, where, a represents the acceleration of the moving member.

[Driving Method 1-A']

The movement in small amount can be effected by following a procedure which is reverse to the cycle described above.

(1) The piezoelectric/electrostrictive element 11 is kept in the stretched state as shown in FIG. 6(a).

(2) The element 11 is then abruptly contracted as shown in FIG. 6(b).

(3) Then, the element 11 is gently reset to the original length so that the moving member is moved in the direction opposite to that in the procedure 1-A explained before.

[Driving Method 1-B]

In the described methods [1-A, 1-A'], the movement is started as the piezoelectric/electrostrictive element 11 is stated to be quickly extended or contracted. In the method 1-B, however, the movement is caused by quickly stopping the deformation of the element.

(1) As shown in FIG. 7(a), the piezoelectric/electrostrictive element 11 is contracted while being gently accelerated. Namely, the piezoelectric/electrostrictive element 11 which has been beforehand stretched is contracted while accelerating the same such that the inertia member 13 receives the acceleration a. If the condition of $\mu(M+m)g \geq ma$, the moving member does not move.

(2) Referring now to FIG. 7(b), the moving member 12 starts to move as the piezoelectric/electrostrictive element 11 quickly stops contraction. More specifically, if the contraction of the element 11 is quickly stopped when the natural length of the element 11 is recovered, the moving member 12 is impacted to start to move. In this case, representing the velocity of the inertia member 13 immediately before the stop of contraction of the element 11 by v, the velocity imparted to the moving member 12 is represented by $V = mv/(M+m)$, where the condition of $v^2 = 2a\Delta l$.

(3) Referring now to FIG. 7(c), the moving member 12 is braked by the frictional force and is then stopped. Namely, the moving member 12 which has just started to move runs until its kinetic energy is reduced to zero because of the frictional force and then stops. The distance traveled by the moving member in this case is represented as follows:

$$\begin{aligned}\Delta x &= [(1/2),(M+m)V^2]/\mu(M+m)g = V^2/2\mu g \\ &= [m/(M+m)]^2(2a\Delta l)/2\mu g \\ &= ma/[\mu g(M+m)] \cdot m\Delta l/(M+m) \leq m\Delta l/(M+m)\end{aligned}$$

Thus, the method 1-B is to accelerate the inertia member 13 into collision with the moving member 12 to impact the latter so as to move the moving member 12 against the frictional force.

The maximum distance of travel is limited by the upper limit of the acceleration imparted to the inertia member 13, and is represented by $m\Delta l/(M+m)$. If the moving member 12 is clamped electrostatically or electromagnetically within the period of said Step (1) above, the acceleration of the inertia member 13 is increased to attain a greater amount of movement.

[Driving Method 1-B']

Fine movement according to a method 1-B' is effected by reversing the operation cycle according to the method 1-B.

(1) As shown in FIG. 8(a), the piezoelectric/electrostrictive element 11 is held in the contracted state.

(2) Then, as shown in FIG. 8(b), the element 11 is caused to expand while being accelerated.

(3) When expansion is stopped, the moving member 12 is driven in the direction which is counter to the direction of movement caused by the driving method 1-B as shown in FIG. 8(c).

A description will be made hereunder as to the driving of the piezoelectric/electrostrictive element.

FIGS. 9(a) to 9(c) are time charts showing an example of operation of the piezoelectric/electrostrictive element in one cycle of operation in which the driving methods 1-A and 1-B explained before are combined. More specifically, FIGS. 9(a), 9(b) and 9(c) represent, respectively, the voltage V applied to the piezoelectric/electrostrictive element 11, the elongation l ($\mu$m) of the piezoelectric/electrostrictive element, and the displacement l ($\mu$m) of the moving member.

Referring to FIG. 9(a), when a voltage V of 150 V is abruptly applied to the piezoelectric/electrostrictive element at a moment $t_1$, the piezoelectric/electrostrictive element exhibits an elongation of about 16 $\mu$m at a moment $t_2$ after elapse of 50 $\mu$s from the moment $t_1$, as shown in FIG. 9(b). In consequence, the moving member travels a distance of about 3 $\mu$m, as shown in FIG. 9(c). Thereafter, the piezoelectric/electrostrictive element is reset while being progressively accelerated past a moment $t_3$ (about 2 ms after) to a moment $t_4$ (about 4 ms after). After the moment $t_4$, the moving member further moves.

FIG. 10 is a time chart illustrating the operation in accordance with the driving methods 1-A' and 1-B'.

FIGS. 10(a) to 10(c) are time charts showing an example of operation of the piezoelectric/electrostrictive element in one cycle of operation in which the driving methods 1-A' and 1-B' explained before are combined. More specifically, FIGS. 10(a), 10(b) and 10(c) represent, respectively, the voltage V applied to the piezoelectric/electrostrictive element 11, the elongation l ($\mu$m) of the piezoelectric/electrostrictive element, and the displacement l ($\mu$m) of the moving member. In this case, the piezoelectric/electrostrictive element is driven in the direction counter to the direction of driving attained in the operation shown in FIG. 9.

Figure 11:
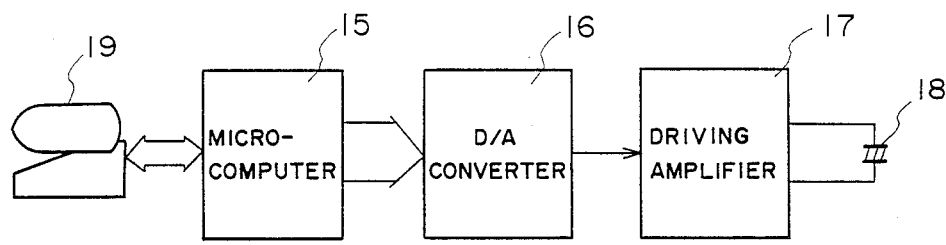
FIG. 11 is a schematic illustration of the construction of the driving system incorporating a piezoelectric/electrostrictive element of the present invention.

The piezoelectric/electrostrictive element is driven in a manner which will be explained hereinunder. FIG. 11 is a schematic block diagram of the driving system for driving the piezoelectric/electrostrictive element, FIG. 12 is a circuit diagram illustrating an example of the driving amplifier used in the system, and FIG. 13 is an illustration of an example of an analog circuit for generating waveform to be input to the driving amplifier.

As will be seen from FIG. 11, a digital signal output from the microcomputer 15 is converted into an analog signal by the D/A converter 16 and is input to the driving amplifier 17, and the output from the driving amplifier 17 is input to the piezoelectric/electrostrictive element 18. A keyboard/display unit 19 is connected to the microcomputer 15 so as to enable input of data for generating waveform, as well as monitoring of the waveform. It is thus possible to input various voltage waveforms as shown in FIGS. 9 and 10 into the driving amplifier 17.

A description will be made hereinafter as to an example of the driving amplifier, with specific reference to FIG. 12. The piezoelectric/electrostrictive element 18 is electrically equivalent to a capacitor and has a comparatively large capacitance of, for example, about 5 $\mu$F. In order to drive this capacitive load by a high voltage, e.g., 150 V, at a high speed, e.g., a settling time of 50 $\mu$s as shown in FIGS. 9 and 10, it is necessary that a large current is supplied to or discharged from the load instantaneously. In other words, it is necessary to cause a quick charge-up and discharge of the capacitive load. For this purpose, the final stage of the driving amplifier is constituted by an amplifier unit of a high voltage and low output impedance.

Figure 12:
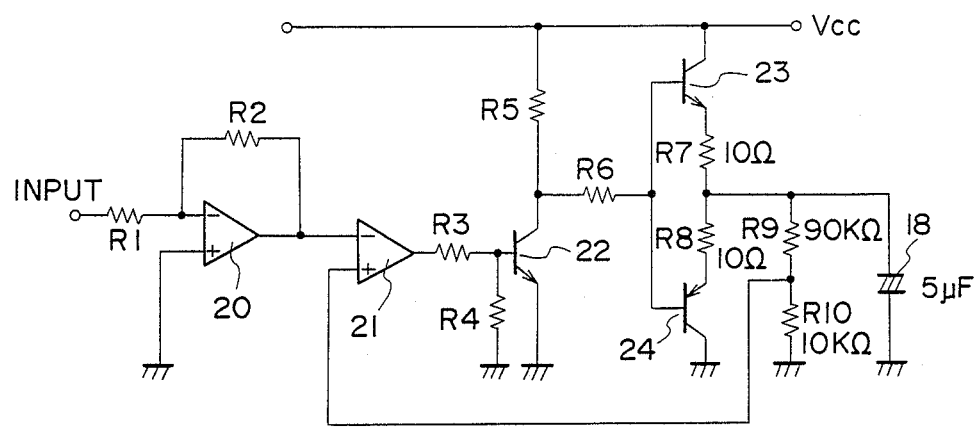
FIG. 12 is a circuit diagram illustrating the construction of a driving amplifier incorporated in the system.

Referring now to FIG. 12, $R_1$ to $R_{10}$ represent resistors, 20, 21 represent amplifiers and 22, 23 and 24 represent transistors. For instance, the resistors $R_7$ and $R_8$ have resistance values of 10$\Omega$, $R_9$ has a resistance value of 90K$\Omega$ and $R_{10}$ has a resistance value of 10K$\Omega$.

When the waveform input to the driving amplifier is formed by an analog circuit, the circuit arrangement may be, for example, as shown in FIG. 13.

The circuit has resistors $R_{11}$ to $R_{17}$, capacitors $C_1$, $C_2$, a diode $D_1$, a P-channel FET (depletion type) 28, an N-channel FET (depletion type) 29, and a D.C. power supply 30 for setting the amplitude of the output. Symbols $V_i$ and $V_0$ respectively represent the input waveform and an output waveform which are applicable to the driving method 1-A' or 1-B' explained before. The portion of the output waveform $V_0$ in the period between a moment $t_1$ and a moment $t_2$ constitute a parabolic curve constituted by a first integration circuit including the resistor $R_{11}$ and the capacitor $C_1$ and a second integration circuit constituted by the resistor $R_{15}$ and the capacitor $C_2$. At a moment $t_3$, the FETs 28 and 29 become conductive so that the capacitors $C_1$ and $C_2$ discharge.

A description will be made hereinunder as to the fine adjustment performed by the described apparatus for effecting fine movement.

When it is desired that the moving member travels a long distance, the operation cycle composed of the methods 1-A and 1-B or the operation cycle composed of the methods 1-A' and 1-B' are repeated. For instance, each cycle has a period of several to ten and several milliseconds, and the travel per each operation cycle is several $\mu$m. The cycle therefore is repeated to cause a movement at a speed of about 0.1 mm/s to 1 mm/s.

In contrast, when it is desired to locate an object within the range of several $\mu$m (i.e., less than the travel by one operation cycle), the following method, for example, is adopted which is different from the method for effecting a long-distance travel explained above. More specifically, the method is similar to the driving method 1-A and 1-A' explained before.

It is assumed here that the moving member has to be located with a precision on the order of 1 $\mu$m. It is also assumed that, although an attempt was made to effect the 1 $\mu$m travel by applying a voltage of 50 V to the piezoelectric/electrostrictive element at a moment $t_1$ as shown in FIG. 14, the moving member actually moved only 0.9 $\mu$m due to a disturbance. This shortage of the travel distance is detected by a sensor and, in order to effect the travel over the remaining 0.1 $\mu$m, the applied voltage is increased by 5 V in a stepped manner at the moment $t_2$. Thus, the applied voltage is increased to 55

V. Thus, when the desired fine position adjustment could not be obtained in the single cycle of operation, the piezoelectric/electrostrictive element is further expanded in a stepped manner similarly to the method 1-A or contracted similarly to 1-A', rather than resetting the length of the piezoelectric/electrostrictive element gently to the original length. This fine adjustment is possible to a fact that, if the factors such as $\mu$, m and k have been selected to enable the influence of the friction to be neglected, the moving member travels a distance which is a function of the elongation $\Delta l$, e.g., a certain proportion $[m/(M+m)]$ of the elongation $\Delta l$, regardless of the initial length of the piezoelectric/electrostrictive element. In the described embodiment the fine position adjustment is commenced from a state in which the piezoelectric/electrostrictive element has been contracted. In some cases, it is quite unknown in which direction the fine movement is to be effected. In such cases, as shown in FIG. 15, the piezoelectric/electrostrictive element is maintained at a state in which it has been elongated by an amount which is half the maximum elongation, and then a high speed movement is effected to bring the object to the command position within several milli seconds. After the fine position adjustment is ceased, the piezoelectric/electrostrictive element is gently to the initial state, i.e., to the half elongation, in such a manner that the force of inertia acting on the inertia member does not exceed the static friction acting between the moving member and the base.

Figure 16:
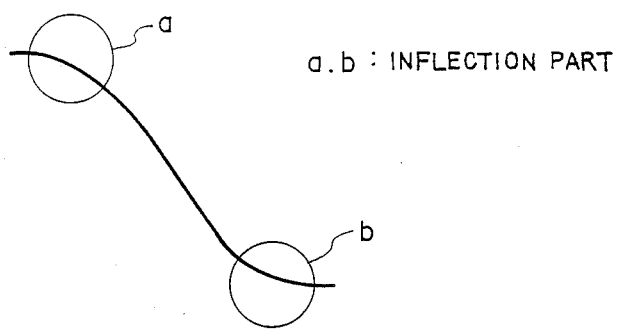
FIG. 16 is an enlarged illustration of waveform of a voltage applied to the apparatus.

The movement tends to occur when the inertia member is accelerated or decelerated. It is therefore necessary that the movement is effected with a constant acceleration as shown in FIG. 16. Namely, acceleration and deceleration are effected in such a manner as to follow the parabolic curve. At the same time, the acceleration is maintained below the level of $\mu(M+m)g/m$.

Figure 17:
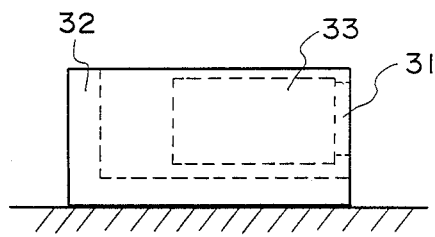
FIG. 17 is a schematic side elevational view of an apparatus for effecting a fine movement which shows a second embodiment of the present invention.
Figure 18:
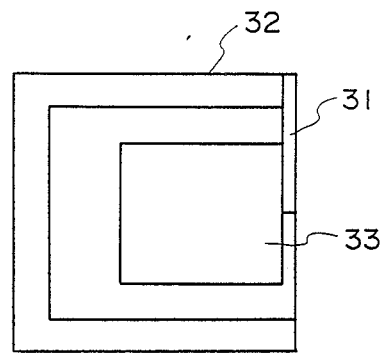
FIG. 18 is a schematic plan view of the second embodiment.

A second embodiment of the present invention will be described hereinunder with reference to FIGS. 17 and 18.

Referring to these Figures, the second embodiment employs a bimorf type piezoelectric/electrostrictive element 31, a moving member 32 to which the piezoelectric/electrostrictive element 31 is attached, and an inertia member 33 attached to the free end of the piezoelectric/electrostrictive element 31.

Figure 19:
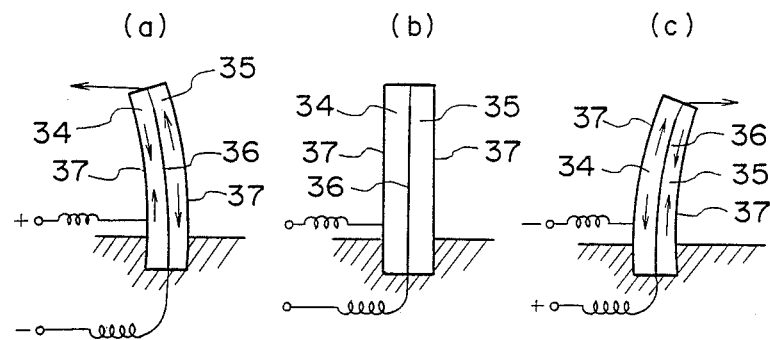
FIG. 19 is an illustration of operation of a bimorf piezoelectric/electrostrictive element.

A general description will be made hereinunder as to the driving of the bimorf type piezoelectric/electrostrictive element, with reference to FIGS. 19(a) to 19(c).

An electrode 36 in the form of a foil is sandwiched between a pair of piezoelectric crystalline plates 34 and 35, and a voltage is applied between the electrode 36 and an external electrodes 37. In consequence, one of the crystalline plates expands while the other contracts, so that the bimorf piezoelectric/electrostrictive element is bent in one direction. Since the moving member is attached to a base end of the piezoelectric/electrostrictive element while the inertia member is attached to the free end of the piezoelectric/electrostrictive element, the moving member is moved in response to an impact generated by the inertia member.

The moving member is held on the base in a manner which will be explained hereinunder. The moving member is held on the base only by friction, so that the moving member is preferably clamped intentionally in the case where a strong external force is expected to be applied to the moving member. The clamping may be effected by, for example, a permanent magnet or an electromagnet. It is also possible to hold the moving member by electrostatic force. The two types of the known methods explained before may be employed. In the case of the present invention, however, the attracting force need not be so large. By adopting the clamping of the moving member in the Step (1) of the driving method 1-B or 1-B', it is possible to accelerate the inertia member with a large acceleration, thereby to attain a greater step of movement.

Figure 20:
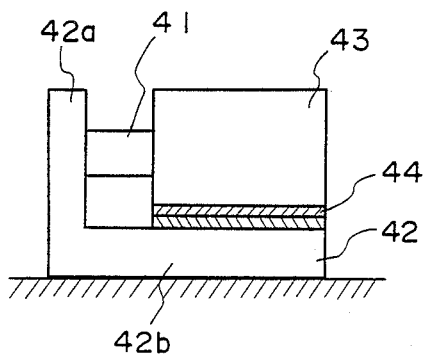
FIG. 20 is a schematic illustration of an apparatus for effecting a fine movement which shows a third embodiment of the present invention.
Figure 21:
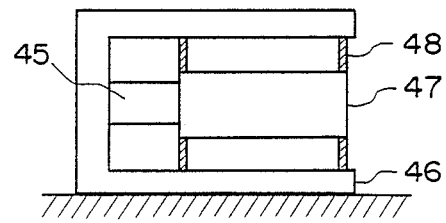
FIG. 21 is a schematic illustration of an apparatus for effecting a fine movement which shows a fourth embodiment of the present invention.

When the inertia member has a large mass, the arrangements shown in FIGS. 3 and 4 and FIGS. 17 and 18 may be unsatisfactory from the view point of durability. In such a case, it is advisable that the inertia member is supported in a manner shown in FIGS. 20 or 21. In the arrangement shown in FIG. 20, the inertia member 43 is attached through the piezoelectric/electrostrictive element 41 to a vertical portion 42a of the moving member 42 which has an L-shaped cross-section. At the same time, the inertia member 43 is supported on the bottom 42b of the moving member 42 through a bearing 44. On the other hand, the arrangement shown in FIG. 21 employs a plurality of leaf springs 48 which supports upper and lower ends of the inertia member 47 provided through the intermediary of the piezoelectric/electrostrictive element 45 of the moving member 46.

A description will be made hereinunder as to an arrangement for locating an object in a three-axis system by making use of the arrangement explained above.

FIGS. 22(a) to 22(f) are plan views of an apparatus for effecting a fine movement, having an impact generating mechanisms each incorporating a piezoelectric-/electrostrictive element. More specifically, impact generating mechanisms a-1 and a-2 are provided on the upper and lower portions of the left side of the moving member 50. Similarly, impact generating mechanisms c-2, c-1, b-1, b-2 and d-2, d-1 are secured to the upper and lower portions of the right side of the moving member 50, the left and right ends of the lower side of the moving member 50 and the left and right ends of the upper side of the moving member 50, respectively.

Figure 22:
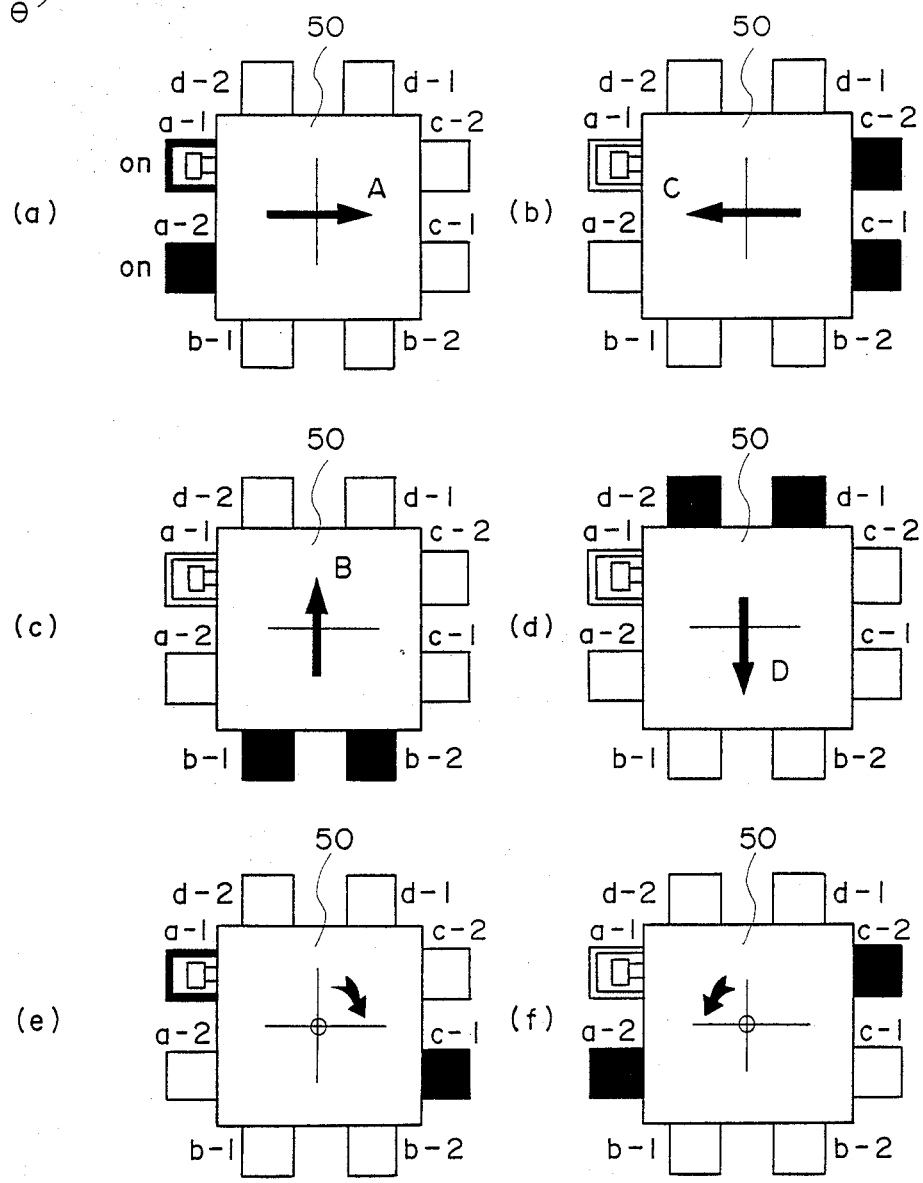
FIG. 22 is a plan view of an apparatus for effecting a fine movement incorporating an impact generating device constituted by a piezoelectric/electrostrictive element.

Referring now to FIG. 22(a), it is possible to drive the moving member 50 in the direction of +x, by driving the impact generating mechanisms a-1 and a-2 by the driving method 1-A or 1-B. Referring now to FIG. 22(b), the moving member 50 is driven in the direction of −x, by driving the impact generating mechanisms c-1, c-2. Similarly, driving of the impact generating mechanisms b-1, b-2 causes the moving member 50 to move in the direction of +y as shown in FIG. 22(c), while the driving of the impacting generating mechanisms d-1, d-2 causes the moving member 50 to move in the direction of −y as shown in FIG. 22(d). Referring now to FIG. 22(e), the impact generating mechanisms a-1 and c-1 are driven to cause the moving member 50 to rotate clockwise as indicated by $-\theta$, whereas, in FIG. 22(f), the impact generating mechanisms a-2 and c-2 are driven to rotate the moving member 50 counter-clockwise as indicated by $+\theta$.

Figure 23:
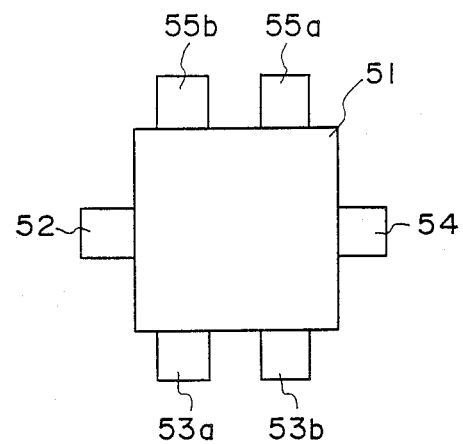
FIG. 23 is a plan view of a modification of the apparatus shown in FIG. 22.

An effect equivalent to that explained in connection with FIGS. 22(a) to 22(f) can be obtained by mounting six impact generating mechanisms 52, 53a, 53b, 54, 55a and 55b on the outer periphery of the moving member 51, as shown in FIG. 23. In this case, however, the rotary motion is effected by selectively using the impact generating mechanisms 53a, 53b and 55a, 55b.

Figure 24:
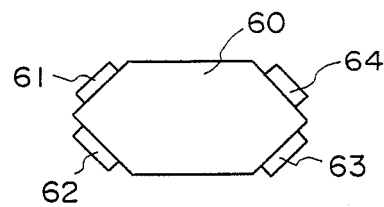
FIG. 24 is a plan view of an apparatus for effecting a fine movement incorporating a second type of impact generating device constituted by a piezoelectric/electrostrictive element.
Figure 25:
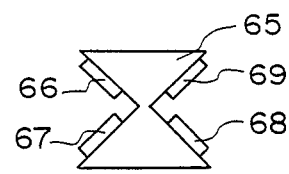
FIG. 25 is a plan view of an apparatus for effecting a fine movement incorporating a third type of impact generating device constituted by a piezoelectric/electrostrictive element.

FIG. 24 shows another arrangement in which impact generating mechanisms 61 to 64 are disposed on six sides of a hexagonally cross-sectioned elongated moving member 60, while FIG. 25 shows an arrangement in which impact generating mechanisms 66 to 69 are attached to the slant surfaces of a moving member 65 which has a varying circular cross-section and contracted at its axially mid portion. With these arrangement, it is possible to effect the driving in the x- and y-axis directions, as well as rotational driving $\theta$, with minimal number of impact generating mechanisms. In these cases also, the impact generating mechanisms can be driven by the driving method 1-A or 1-B, i.e., in such a manner as to push the moving member. Thus, in the arrangement shown in FIG. 24, the driving in the $+x$ direction is effected by the activation of the impact generating mechanisms 61 and 62, while the driving in the $+y$ direction and in the $+\theta$ direction are effected, respectively, by the operations of the impact generating mechanisms 62, 63 and 61, 63. On the other hand, in the arrangement shown in FIG. 25, the driving in the $+x$ direction is caused by the operations of the impact generating mechanisms 66 and 67. The driving in the $+y$ direction and in the $+\theta$ direction are respectively caused by the impact generating mechanisms 66, 69 and the impact generating mechanisms 67, 69.

Figure 26:
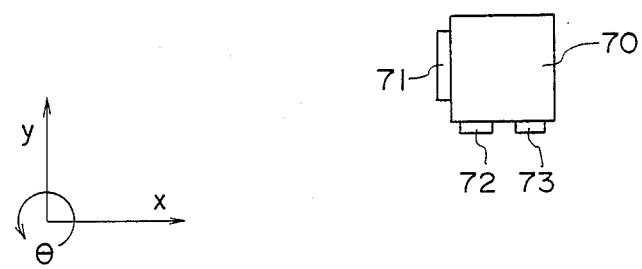
FIG. 26 is a plan view of an apparatus for effecting a fine movement incorporating a fourth type of impact generating device constituted by a piezoelectric/electrostrictive element.

Each impact generating mechanism can impart impact both in the positive and negative directions, so that the desired movement can be attained only by three impact generating mechanisms 71 to 73 provided on the moving member 70 as shown in FIG. 26. More specifically, the impact generating mechanism 71 is driven in accordance with the driving methods 1-A and 1-B so that the movement in the $+x$ direction is attained. The movement in the $+y$ direction is effected by driving the impact generating mechanisms 72 and 73 in accordance with the methods 1-A,1-B. The movement in the $+\theta$ direction is attained by driving the impact generating mechanism 72 in accordance with the driving methods 1-A', 1-B', while driving the impact generating mechanism 73 in accordance with the driving methods 1-A,1-B. The movement in the $-x$ direction is effected by driving the impact generating mechanism 71 in accordance with the driving methods 1-A', 1-B'. At the same time, the driving in the $-y$ direction is caused by driving the impact generating mechanisms 72 and 73 in accordance with the driving methods 1-A', 1-B'. Finally, the driving in the $-\theta$ direction is caused by driving the impact generating mechanism 72 by the driving methods 1-A,1-B, while driving the impact generating mechanism 73 by the driving methods 1-A',1-B'.

Figure 27:
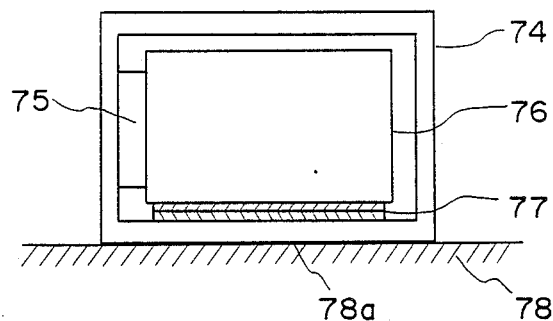
FIG. 27 is a schematic illustration of an apparatus for effecting a fine movement which shows a fifth embodiment of the present invention.

Although in the described embodiments the impact generating mechanisms are secured to the outer side of the moving member, the impact generating mechanisms preferably are not provided on the outer side, for a reason which will be explained hereinunder. Namely, the amount of movement is determined as $\Delta x = m\Delta l/(M+m)$ so that the mass of the inertia member is preferably large. It is easier to obtain the balance of the inertia member by supporting the same at a point inside the moving member. In addition, the provision of the impact generating mechanism inside the moving member makes it easy to realize such an arrangement in which the piezoelectric/electrostrictive element is free from bending moment. FIG. 27 shows an example of the arrangement constructed from this point of view and designed to effect a uni-axial movement. As will be seen from FIG. 27, this arrangement employs a moving member 74, a piezoelectric/electrostrictive element 75, an inertia member 76, a bearing 77, and a base 78 having a friction surface 78a.

Figure 28:
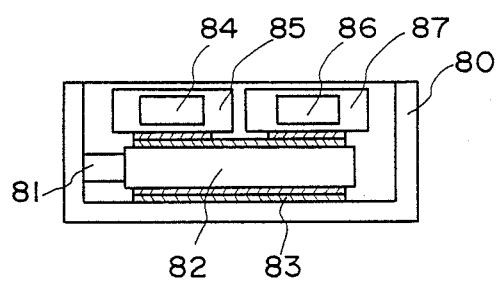
FIG. 28 is a schematic sectional view of an apparatus for effecting a fine movement which shows a sixth embodiment of the present invention.
Figure 29:
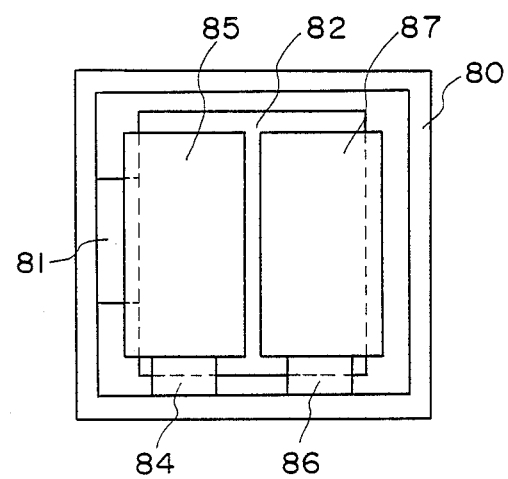
FIG. 29 is a plan view of the sixth embodiment.

FIGS. 28 and 29 show an example of the apparatus of the invention for effecting fine movement along three axes. This apparatus has a box-shaped moving member 80, piezoelectric/electrostrictive elements 81, 84, 86, inertia members 82, 85, 87 and bearings 83. Thus, the impact generating mechanism is loaded to be operative three-dimensionally.

Figure 30:
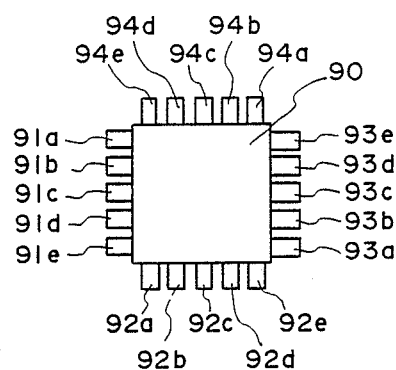
FIG. 30 is a plan view of an apparatus for effecting a fine movement incorporating a sixth type of impact generating device constituted by a piezoelectric/electrostrictive element.

When the moving member is constructed by making use of a bimorf element, it takes a considerable time for the vibration of the spring to be ceased. It is, therefore, effective to provide units of impact generating mechanisms such as those denoted by 91a–91e, 92a–92e, 93a–93e and 94a–94e on the respective sides of the moving member 90 and to drive them in sequence as shown in FIG. 30.

A description will be made hereinunder as to the construction of the piezoelectric/electrostrictive element used in the apparatus of the present invention.

Figure 31:
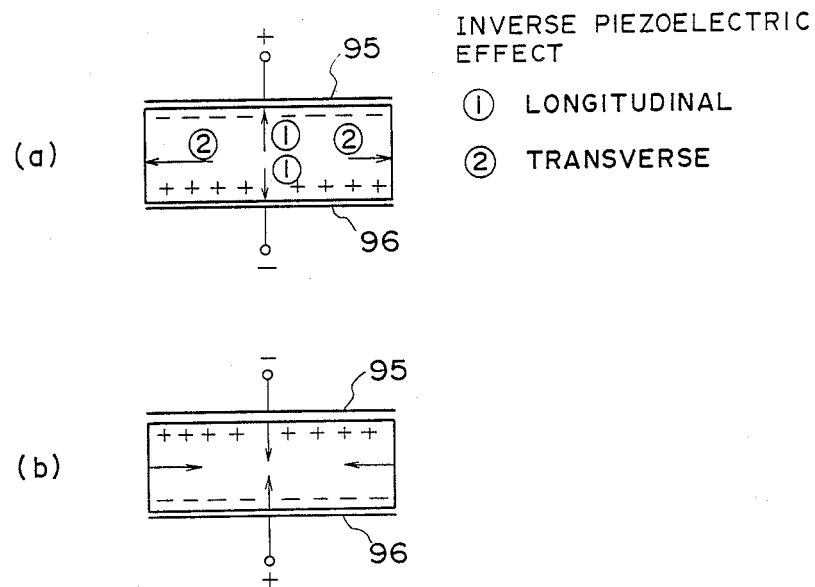
FIG. 31 is a schematic illustration of operation of the piezoelectric/electrostrictive element of the present invention.

The piezoelectric/electrostrictive element used in the apparatus of the invention is made of, for example, a piezoelectric element such as quartz or Rochelle salt, and is mounted between a pair of electrodes 95 and 96 as shown in FIG. 31. In operation, a voltage is applied, for example, that the electrode 95 is set at plus (+), while the electrode 96 is set at minus (−) as shown in FIG. 31(a), so that the piezoelectric/electrostrictive element produce a force which tends to expand the piezoelectric/electrostrictive element (inverse piezoelectric effect). The magnitude of the force is substantially proportional to the level of the electric field, and the direction of the strain can be reversed by reversing the direction of the electric field as shown in FIG. 31(b). It is possible to obtain the strain in desired directions according to the orientation of cutting of crystals. For instance, the strain can appear in the same direction as the charges (longitudinal piezoelectric effect) or in the orthogonal direction to the direction of charges (transverse piezoelectric effect). It is also possible to attain the strain in the form of a slip of the material.

The piezoelectric/electrostrictive element used in the apparatus of the present invention includes so-called electrostrictive elements which, when placed in the influence of an external electric field, produces a strain substantially proportional to the square of the intensity of the electric field. Examples of such materials are strong dielectric materials such as ceramics of barium titanate system and ceramics of titanate-zirconate system.

It is also possible to use a magnetostrictive element in place of the piezoelectric/electrostrictive element used in the embodiments. In particular, magnetostrictive alloys formed from iron and various rare earth elements such including terbium, samarium, holmium and dysprocium can have such a property as to expand very quickly and the amount of extension is large, according to the preparation methods of such alloys, so that they can conveniently be used in the apparatus of the invention for effecting fine movement.

As will be understood from the foregoing description, the present invention offers the following advantages.

(1) It is possible to obtain an apparatus for effecting fine movement, having a compact and simple construction.

(2) It is also possible to obtain an apparatus for effecting fine movement, which does not seriously impair environmental conditions, because the apparatus does not produce any magnetic field and electromagnetic noise, nor it produces sound and dust which may otherwise be caused by the collision of the inertia member.

Although specific forms of the invention have been described, it is to be understood that various changes and modifications may be imparted to the described embodiments without departing from the scope of the invention.

What is claimed is:

1. An apparatus for effecting a fine movement, comprising:
   (a) a moving member;
   (b) a piezoelectric/electrostrictive element means attached to said moving member for generating moving force;
   (c) means for driving said piezoelectric/electrostrictive element; and
   (d) an inertia member means attached to said piezoelectric/electrostrictive means for imparting inertial energy to said moving member.

2. An apparatus according to claim 1, wherein said inertia member means is supported on said moving member through a bearing.

3. An apparatus according to claim 1, wherein said inertia member means is supported on said moving member through a spring.

4. An apparatus according to claim 1, wherein said piezoelectric/electrostrictive element means is a bimorf type element.

5. An apparatus according to claim 1, wherein a plurality of piezoelectric/electrostrictive element means is provided in combination with at least one of said inertia member means for providing movement to said moving member in a plurality of directions.

6. An apparatus according to claim 1, wherein a plurality of said piezoelectric/electrostrictive element means is provided in combination with at least one of said inertia member means on a plurality of side surfaces of said moving member.

7. An apparatus according to claim 1, wherein a plurality of said piezoelectric/electrostrictive element means is provided in combination with said inertia member means within said moving member for providing movement in the directions of a plurality of axes.

8. An apparatus according to claim 1, wherein said means for driving said piezoelectric/electrostrictive element means includes a fine adjusting means for effecting a fine adjustment.

* * * * *